United States Patent
Ericson et al.

(10) Patent No.: US 8,824,452 B2
(45) Date of Patent: Sep. 2, 2014

(54) SYSTEM AND METHOD FOR SUBSCRIBER-BASED POLICY MANAGEMENT

(71) Applicant: Oracle International Corporation, Redwood Shores, CA (US)

(72) Inventors: Tomas Ericson, San Francisco, CA (US); Rahul Shinde, Fremont, CA (US); Niklas Modin, Oakland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 94 days.

(21) Appl. No.: 13/671,053

(22) Filed: Nov. 7, 2012

(65) Prior Publication Data

US 2014/0126369 A1    May 8, 2014

(51) Int. Cl.
H04L 12/28    (2006.01)
(52) U.S. Cl.
USPC .......................................................... 370/351
(58) Field of Classification Search
None
See application file for complete search history.

(56) References Cited

U.S. PATENT DOCUMENTS

| | | | |
|---|---|---|---|
| 2005/0198164 A1* | 9/2005 | Moore et al. ................... | 709/206 |
| 2007/0206735 A1* | 9/2007 | Silver et al. ................. | 379/88.19 |
| 2008/0229096 A1* | 9/2008 | Alroy et al. .................... | 713/155 |
| 2010/0166167 A1* | 7/2010 | Karimi-Cherkandi et al. ......................... | 379/201.05 |
| 2011/0110366 A1* | 5/2011 | Moore et al. .................... | 370/352 |
| 2011/0209202 A1* | 8/2011 | Otranen ............................ | 726/4 |
| 2011/0222492 A1* | 9/2011 | Borsella et al. ............... | 370/329 |
| 2012/0195417 A1* | 8/2012 | Hua et al. .................. | 379/142.04 |
| 2012/0290698 A1* | 11/2012 | Alroy et al. .................... | 709/223 |

\* cited by examiner

Primary Examiner — Clemence Han
(74) Attorney, Agent, or Firm — Meyer IP Law Group (57) ABSTRACT

In accordance with various embodiments, systems and methods of mapping an event related to a subscriber to an associated subscriber profile associated with a global unique identifier (GUID) associated with the specific subscriber, regardless of the particular subscriber identifier associated with the event. The system includes a routing module which is operable to resolve the GUID from a variety of identifiers and identifier types which might be associated with an event. The method can receive a subscriber identifier associated with an event, resolve the subscriber identifier to a global unique identifier (GUID), and route the event to a single actor for processing in accordance with the subscriber's profile and thereby provide the appropriate services and quality of service.

19 Claims, 6 Drawing Sheets

SYSTEM AND METHOD FOR SUBSCRIBER-BASED POLICY MANAGEMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to a system and method for providing subscriber-centric routing of network traffic/events in a telecommunications network.

BACKGROUND

The telecommunications network domain is moving towards an IP-based architecture. However, telecommunications networks currently include and/or support several different network types such as traditional circuit-switched telephone networks and more modern IP-based networks. Although these disparate systems are being integrated, subscribers are and will for many years to come, use both legacy services and newly developed IP-based services. The various legacy communication systems utilize different protocols and different subscriber identifiers developed for use with the protocols. This means that subscriber access to the telecommunications network uses multiple types of subscriber identifiers, for example e164, IMSI, and SIP URI etc.

A subscriber may have multiple sessions and multiple services running at the same time. Moreover the subscriber could be using multiple devices and subscriber identifiers to access these services. To come up with a policy decision for shaping a subscriber's traffic (QoS), a complete view of a subscriber's current activities and sessions is desirable. However most legacy services have been developed as closed silo applications, meaning they run as standalone applications which handle traffic and administration, each maintaining a separate version of a subscriber's profile information. Thus different protocols and services are typically treated in separate systems making a complete view of subscriber activity difficult to obtain.

SUMMARY

Embodiments of the present invention provides for subscriber-centric routing of network traffic/events. This is accomplished by making use of a subscriber service which associates multiple subscriber identifier types per subscriber with a GUID and routing all the sessions associated with the GUID to a single processing element (actor). A single subscriber can have multiple subscriber identifiers of the same or different types, e.g. e164, IMSI, SIP URI. The subscriber service associates profile attributes and also any subscriber identifiers to a subscriber profile associated with a GUID associated uniquely with a particular subscriber. Multiple services can share/reuse a common subscriber profile provided by the subscriber service regardless of the subscriber identifier types used by the service. The use of a common subscriber profile provided by the subscriber service reduces and/or eliminates the need for data synchronization between data stores holding user profile data. The subscriber profile can also be extended with service specific attributes.

The subscriber-centric event routing can be achieved by having incoming traffic establishing a session (so-called initial request) including at least one of the subscriber identifiers being pre-processed by the entity/component receiving the request. The subscriber identifier is extracted from the request and the subscriber profile service is invoked to lookup the GUID. After the GUID is identified, the request is forwarded to the single processing element (actor) responsible for establishing sessions and delivering services to the subscriber assigned that specific GUID. Furthermore, the use of the same actor for all sessions of a subscriber allows a network operator to make policy management decisions based on all of subscriber's current sessions, thereby allowing an operator to provide more individual service plans tailored for the specific needs of a subscriber, and to better monetize its existing networks by achieving a better utilization of the network.

In accordance with embodiments of the invention, systems and methods are provided for mapping an event related to a subscriber to a GUID, regardless of the particular subscriber identifier (e.g. e164, IMSI, SIP URI) associated with the event. The system can include a subscriber profile service which is operable to resolve the GUID from a variety of identifiers and identifier types which might be associated with an event. The method can receive a subscriber identifier associated with an event and resolve the subscriber identifier to determine the GUID.

In accordance with various embodiments of the invention, systems and methods are provided for routing all events related to a subscriber to a single actor for processing in accordance with the subscriber's profile and providing the appropriate services and quality of service. The system includes a router module which routes all events associated with a particular subscriber to the same actor for processing. The router module invokes a subscriber profile service in order to resolve a GUID from a variety of identifiers and identifier types which might be associated with an event. The router module uses the GUID to identify the single actor for routing of the event for processing in accordance with the subscriber's profile and provide the appropriate services and quality of service.

Other objects and advantages of the present invention will become apparent to those skilled in the art from the following detailed description of the various embodiments, when read in light of the accompanying drawings.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears. The present invention provides systems and methods of mapping an event related to a subscriber to an associated subscriber profile associated with a GUID, regardless of the particular subscriber identifier associated and/or provided with the event. The system can include a subscriber profile service which is operable to resolve the GUID from a variety of identifiers and identifier types which might be associated with an event. The method can receive a subscriber identifier associated with an event, resolve the subscriber identifier to a GUID, and use the GUID to route the event to a single actor for processing. That is to say a single actor processes all events related to the subscriber regardless of the particular subscriber identifier provided.

Figure 1:
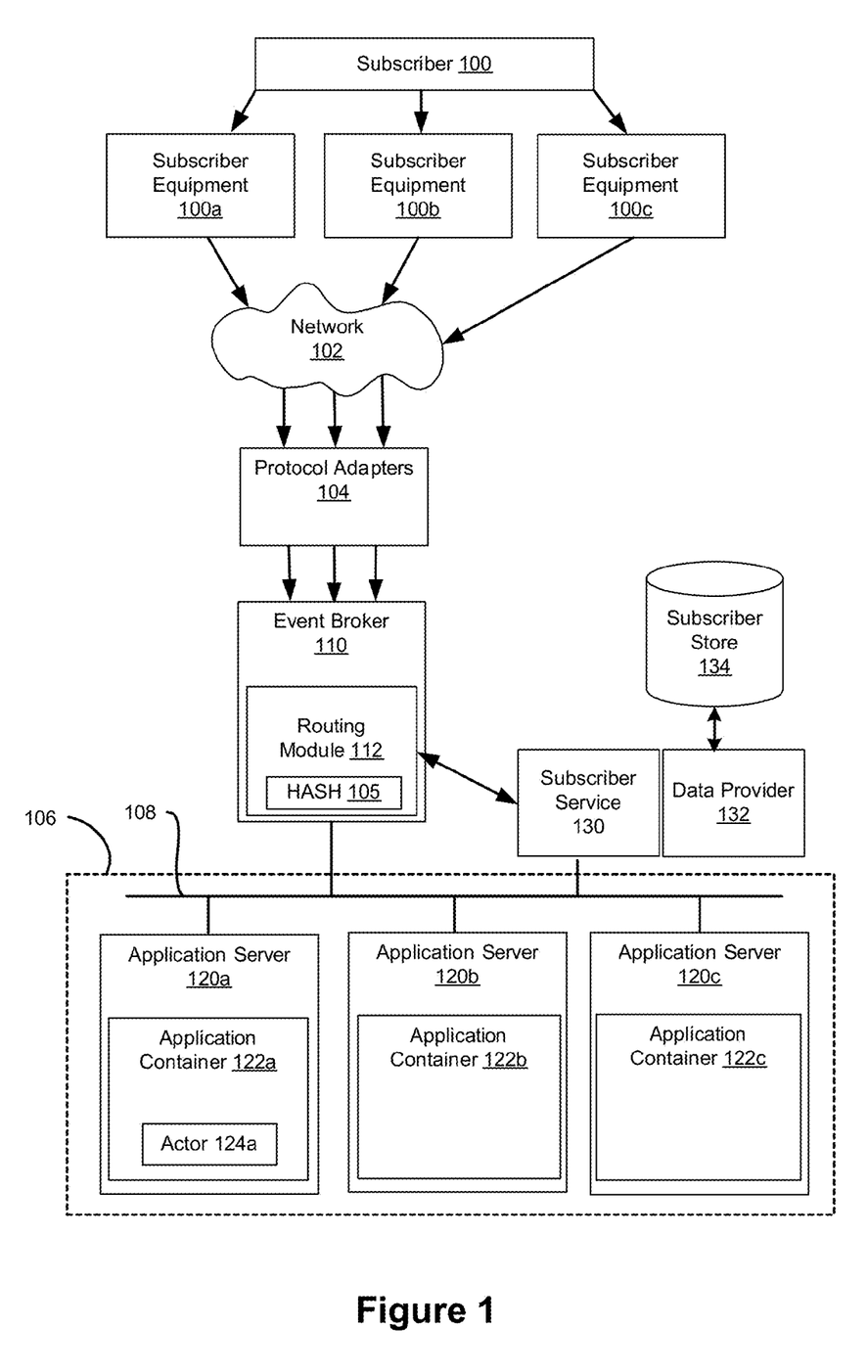
FIG. 1 shows a system for subscriber-centric routing of network traffic/events, in accordance with an embodiment of the invention.

FIG. 1 shows a system for mapping an event related to a subscriber to an associated subscriber profile associated with a GUID, regardless of the particular subscriber identifier associated with the event in accordance with an embodiment of the invention. As shown in FIG. 1, a subscriber 100 can access a telecommunications network 102 utilizing a variety of subscriber equipment 100a, 100b, 100c. Subscriber equipment 100a, 100b, 100c represents different equipment associated with the same subscriber (for example a single subscriber may access the network 102 using a DSL modem, cellular phone, home phone and the like) and/or different features of such equipment which communicate with network 102 using different protocols. Indeed, a subscriber 100 may access 102 using multiple pieces of the subscriber equipment at the same time thus having concurrent sessions active on the network 102 (for example making a mobile or VOIP phone call while streaming a movie over the DSL modem). Network 102 is connected by protocol adapters 104 to an event broker 110. In response to activities of subscriber equipment 100a, 100b, 100c and/or network 102, protocol adapters 104 publish requests to event broker 110.

Protocol adapter 104, first utilizes hash function HASH 105 to add attributes to the incoming request. HASH 105 is a so-called hash function, an entity that is invoked before the event is published to the event broker. This hash function is part of a policy control and rules function application (PCRF), the logic of which is executed in the Actor 124a, but is deployed and invoked in the routing module 112. In an embodiment of the invention, an attribute called PcrfHash is added to the incoming event (CCR), the value of the PcrfHash attribute is calculated by taking the hashcode value of the GUID, which is retrieved by performing a look-up in the Subscriber Service 130, modulo the number of session actors. Each session actor can process sessions of one or multiple subscribers.

Event broker 110 is operative to dispatch requests to computing platform 106 in response to particular requests ("events") published by the protocol adapter 104. Requests arriving at event broker 110 are protocol and address type agnostic. Various legacy communication systems utilize different protocols and different subscriber identifiers developed for use with the protocols. This means that subscriber access to the network 102 uses multiple types of subscriber identifiers, for example e164, IMSI, and SIP URI etc. The requests published to event broker 110 by protocol adapter 104 can therefore include any one of a variety of subscriber identifiers or subscriber identifier types associated with subscriber 100. However, event broker 110 includes a routing module 112 which can resolve the particular subscriber identifier associated with an event to the GUID associated with the subscriber and identify the actor 124a associated with the GUID. Routing module 112 is thereby adapted to route all requests from subscriber 100 to the same actor 124a.

Distributed and clustered computing platform 106 includes a plurality of application servers 120a, 120b, 120c connected by a platform network 108. Application servers 120a, 120b, 120c include application containers 122a, 122b, and 122c. Application containers 120a, 120b, 120c are capable of supporting execution of logic by applications for example actor 124a. Different subscribers will each have their own assigned actors. Routing module 112 of event broker 110 dispatches requests associated with a particular subscriber to the actor associated with the particular subscriber.

As discussed above, the requests received by event broker 110 from protocol adapters include a variety of different identifier types associated with subscriber 100. A single subscriber 100 can have multiple subscriber identifiers of the same or different types, e.g. e164, IMSI, SIP URI. A subscriber service 130 is provided which is adapted to resolve the variety of different identifier types and provide event broker 110 with a GUID associated with a specific subscriber 100. Subscriber service 130 utilizes a pluggable data provider 132 with access to a subscriber store 134 to resolve the variety of different identifier types associated with subscriber 100 to determine the GUID. The subscriber service 130 includes subscriber profiles containing GUIDs and other subscriber identifier types and profile attributes.

Routing module 112 can be implemented, for example, as one or more router actors. The routing module 112 accesses the subscriber service 130 to resolve the subscriber identifier provided with a request/event and receive the GUID from the subscriber service 130. The routing module 112 then routes all requests of subscriber 100 to the same application container 122a and actor 124a. Thus actor 124a receives and can process all the requests from subscriber 100. Actor 124a can also communicate with subscriber service 130 over platform network 108. For example, actor 124a can retrieve the subscriber profile and attributes of subscriber 100 from subscriber service 130. The actor 124a can thus process the request in accordance with service and quality of service constraints specified in the subscriber profile associated with the subscriber and GUID.

Actor 124a can process requests from subscriber 100 in accordance with the subscriber's profile and provide the appropriate services and quality of service, in light not only of the subscriber profile, but also in light of other pending requests from the same subscriber and/or already established sessions of the same subscriber. The single processing element (actor 124a) is responsible for establishing sessions and delivering services to the subscriber assigned that specific GUID. The use of the same processing element (actor 124a) for all sessions of subscriber 100 allows a network operator to make policy management decisions based on all of the current sessions of subscriber 100, thereby allowing an operator to provide more individual service plans tailored for the specific needs of subscriber 100, and to better monetize its existing networks by achieving a better and more fair utilization of the network.

In an embodiment of the invention, subscriber store 134 is a flexible data structure which includes a representation of subscriber-related data. The data in subscriber store 134 specifies the service access preferences and parameters for each subscriber. The information in the subscriber store is intended to supplement the information in an operator's existing subscriber repository or billing system. While existing subscriber repositories contain general account information, the subscriber store 134 contains data specifically relating to the delivery of user-targeted services over diverse networks. A profile is created within the subscriber store 134 for each subscriber. A subscriber profile data model defines the elements of a subscriber profile within the flexible data structure of the subscriber store 134. The model includes general information for the subscriber along with feature-specific information, such as policy controller data. The profile can include activation dates, account type, date of birth, notification channel, services, service restrictions, home network, network identifiers, and the like. The flexible data structure can be readily extended to include new elements as new features are introduced.

One feature of the subscriber store 134 is a user identifier element which contains the GUID associated with a specific subscriber on a particular network. A subscriber can belong to multiple networks, for instance, if they own multiple devices used to access different networks. Therefore, a subscriber can have multiple identifiers. Each identifier consists of the identifier value and the type of the identifier. The type represents the system in which the identifier belongs. The type may have, for example, one of the following values: END_USER_E164 (the subscriber's identity in ITU-T E.164 format, as defined in recommendations E164 and CE164); END_USER_IMSI (the subscriber's identity in International Mobile Subscriber Identity format, as defined in ITU-T recommendations E212 and CE212); END_USER_SIP_URI (the subscriber's identity in a SIP network); END_USER_NAI (the subscriber's identity in a mobile IP Network Address Identifier format); END_USER_PRIVATE (the subscriber's private identity in a credit-control server); and END_USER_GLOBAL_UID (the global unique identifier generated automatically when the subscriber profile is created and used to identify subscribers internally). The specific value for each identifier type varies by the network type. For example, the identifier for the END_USER_SIP_URI type should be in the form of a SIP URL, such as sip:username@example.

Figure 2A:
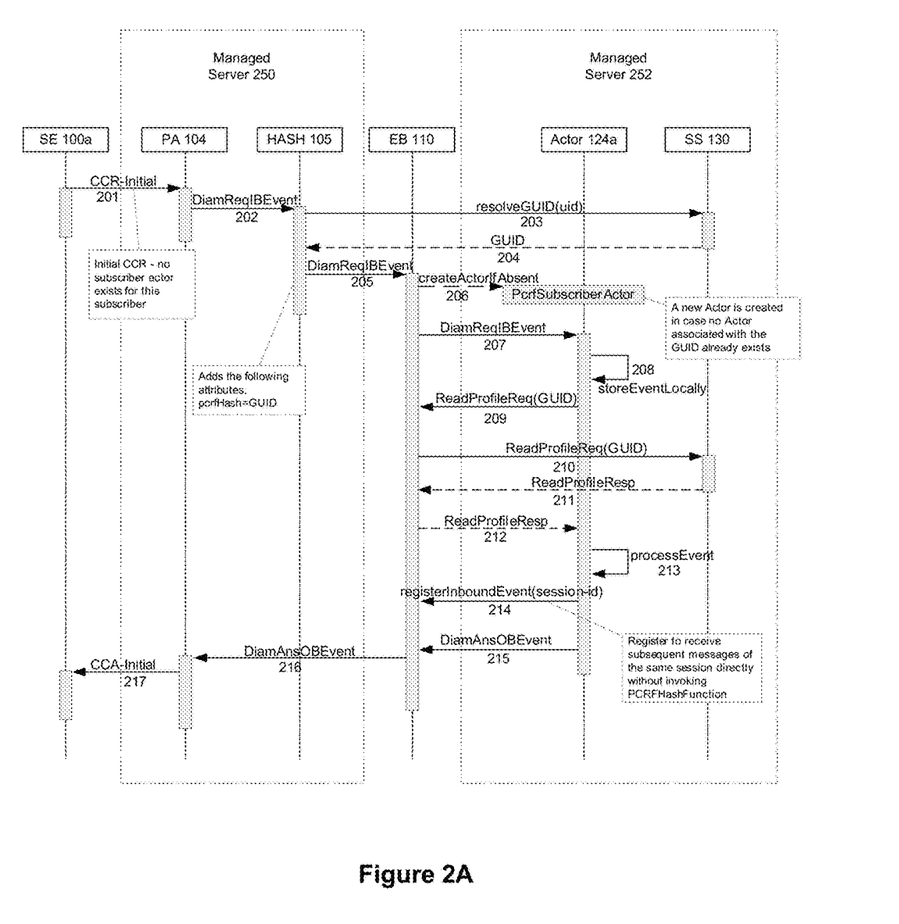
FIGS. 2A and 2B show routing and flow in a system for subscriber-centric routing of network traffic/events, in accordance with an embodiment of the invention.
Figure 2B:
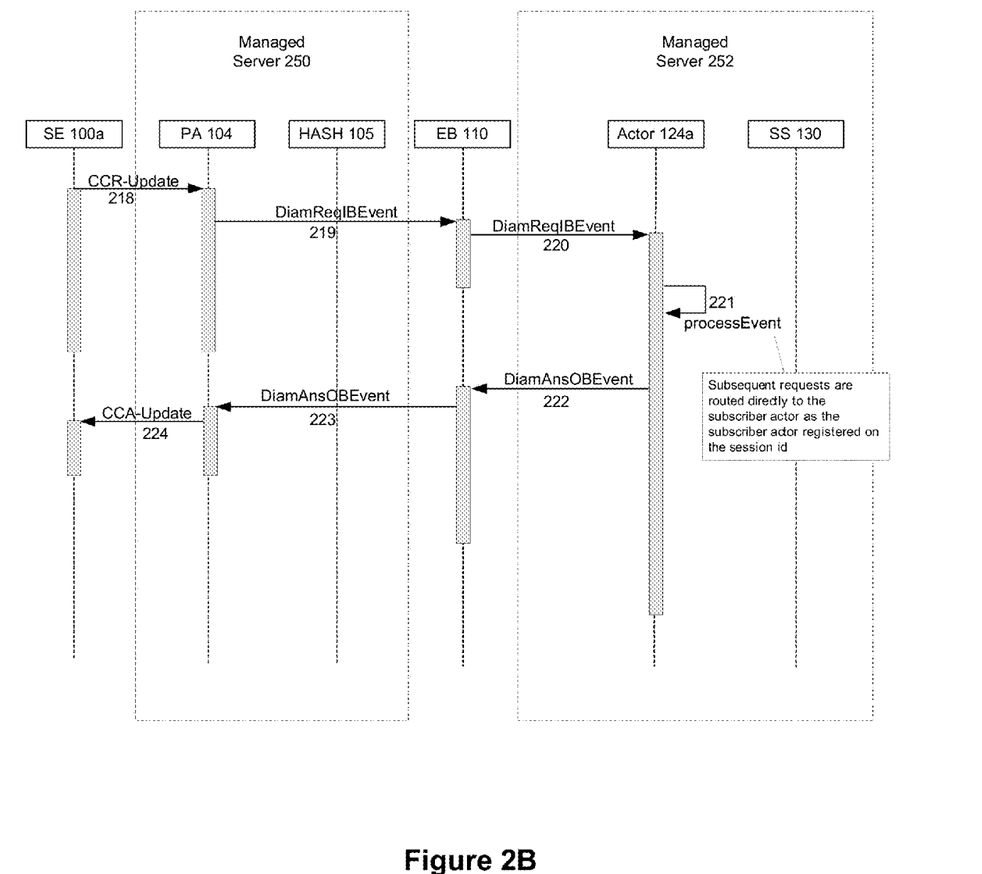

FIGS. 2A and 2B show examples of routing and flow in a system for subscriber-centric routing of network traffic/events, in accordance with a preferred embodiment of the invention. FIG. 2A shows an example of routing and flow for an initial credit control request (CCR) received over a Diameter interface. Prior to this request no actor has been established related to the particular subscriber having the particular GUID. FIG. 2B shows examples of routing and flow for subsequent requests. These requests can therefore be directed to the previously established actor associated with the GUID.

As shown in FIG. 2A, at 201 an initial credit control request is received from subscriber equipment 100a over the network over a Diameter interface. At this point no actor has been instantiated for this subscriber.

At 202, protocol adapter 104, forwards the request to policy control and rules function hash function HASH 105 which adds attributes to the request. HASH 105 is a so-called hash function, an entity that is invoked before the event is published to the event broker.

This hash function is part of a policy control and rules function application (PCRF), the logic of which is executed in the Actor 124a, but is deployed and invoked in the routing module 112. In this case, an attribute called PcrfHash is added to the incoming event (CCR), the value of the PcrfHash attribute is calculated by taking the hashcode value of the GUID modulo the number of session actors. At 203, the subscriber store 130 is called to resolve the GUID. The subscriber store responds 204 with the GUID.

At 205 the modified request is published to event broker 110. At 206, actor 124a is instantiated (if absent). At 207, the event is forwarded to the actor 124a. At 208 the event is stored locally with the actor 124a. At 209 actor request to read the profile associated with the GUID. At 210 the event broker 110 submits the profile read request to subscriber store 130. At 211, the subscriber store provides the profile read response. At 212, the event broker 110 submits the profile read response to the actor 124a. At 213, the actor processes the event (CCR) in light of the retrieved profile information. At 214, actor 142a registers the inbound event with the event broker 110. At 215, the actor 124a responds to the initial credit control request event. At 216, the event broker 110 publishes the response to the protocol adapter 104. At 217 the response is forwarded to the subscriber equipment 100a.

FIG. 2B shows examples of routing and flow for subsequent requests. Subsequent requests having the same session identifier are routed directly to the actor 124a associated with the subscriber 100 because the actor 124a is already registered with respect to the session identifier. As shown in FIG. 2B, a subsequent update credit control request is received from subscriber equipment 100a over the network via a Diameter interface at 218. This request has the same session identifier as the prior request and an actor 124a has already been instantiated for this subscriber. At 219, protocol adapter 104, forwards the request to event broker 110. At 220, event broker 110 transmits the event to actor 124a. At 221, actor 124a processes the event. At 222, the actor 124a responds to the updated credit control request. At 223, the event broker 110 publishes the response to the protocol adapter 104. At 224, the response is forwarded to the subscriber equipment 100a.

Figure 3:
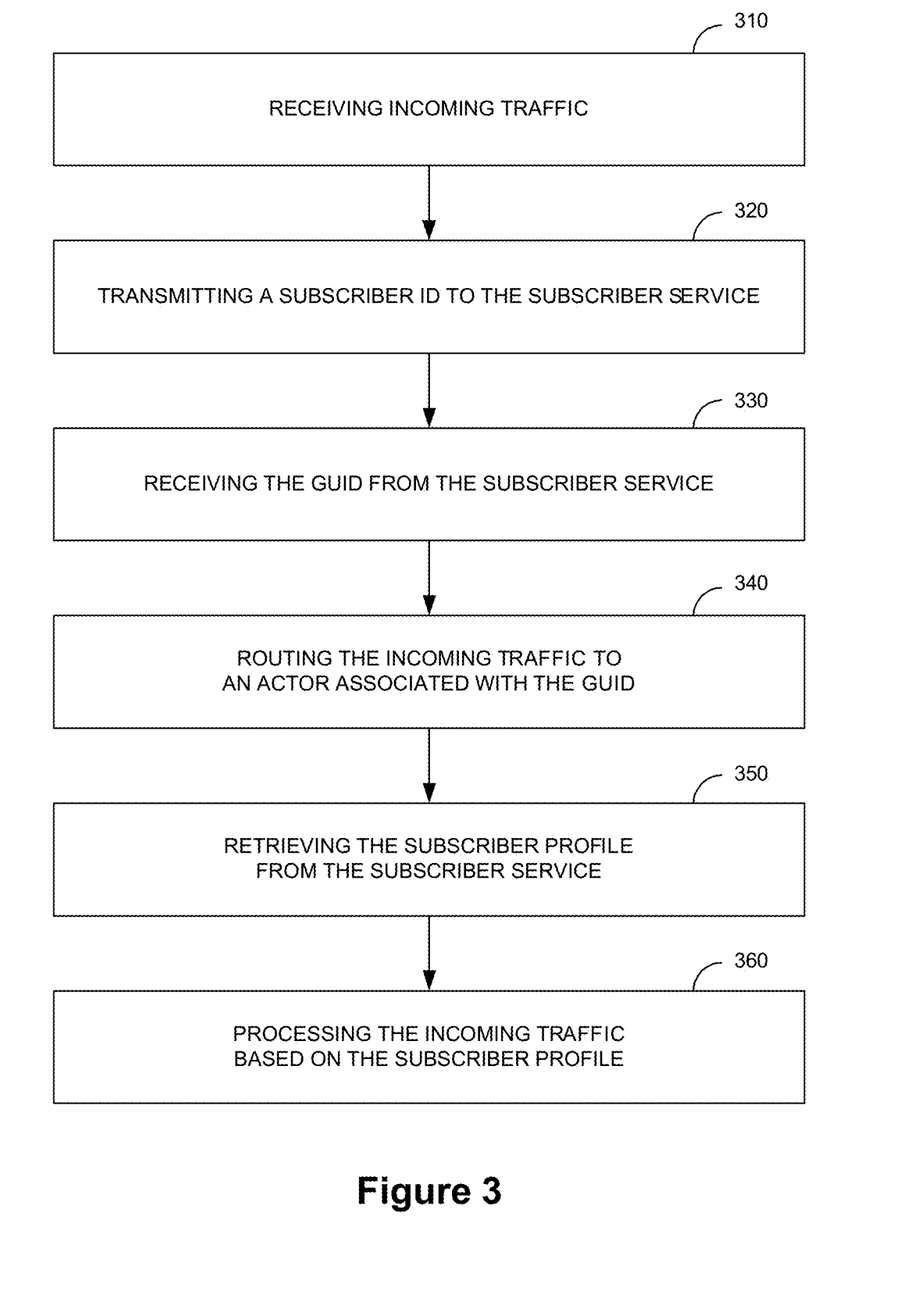
FIG. 3 shows a method for subscriber-centric routing of network traffic/events, in accordance with an embodiment of the invention.

FIG. 3 shows a method for subscriber-centric routing of network traffic/events, in accordance with an embodiment of the invention. At step 310 incoming traffic is received from the subscriber. The incoming traffic includes a subscriber identifier out of the plurality of different subscriber identifiers associated with the subscriber. The incoming traffic can be, for example, a credit control request. The incoming traffic can include multiple concurrent sessions. At step 320, the subscriber identifier is transmitted to a subscriber service. The subscriber service has access to a subscriber store which includes subscriber profiles, subscriber service attributes, and subscriber identifiers, including the GUID. At step 330, the GUID is received from the subscriber service. At step 340, the incoming traffic is routed to a specific actor associated with the GUID. At step 350 the subscriber profile is retrieved from the subscriber service—including for example service attributes. At step 360, the single actor associated with the GUID processes the incoming traffic based on the subscriber profile. The specific processing element (actor 124a) associated with the GUID is responsible for establishing all sessions and delivering services to the specific subscriber assigned that GUID. The use of a single processing element for all sessions of the subscriber allows a network operator to make policy management decisions based on all of the concurrent sessions of the subscriber, thereby allowing an operator to provide more individual service plans tailored for the specific needs of the subscriber, and to better monetize its existing networks by achieving a better utilization of the network.

Figure 4A:
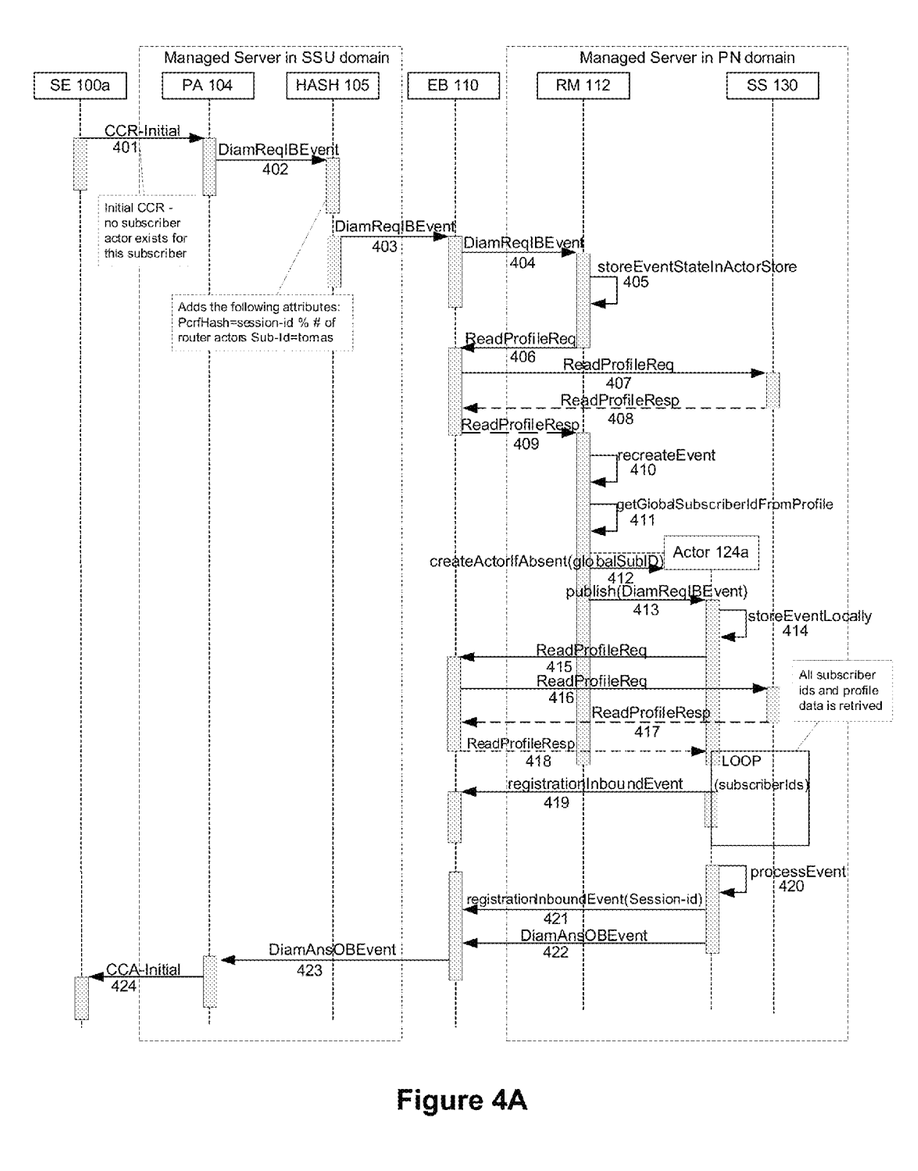
FIGS. 4A and 4B show routing and flow in an alternative system for subscriber-centric routing of network traffic/events, in accordance with an embodiment of the invention.
Figure 4B:
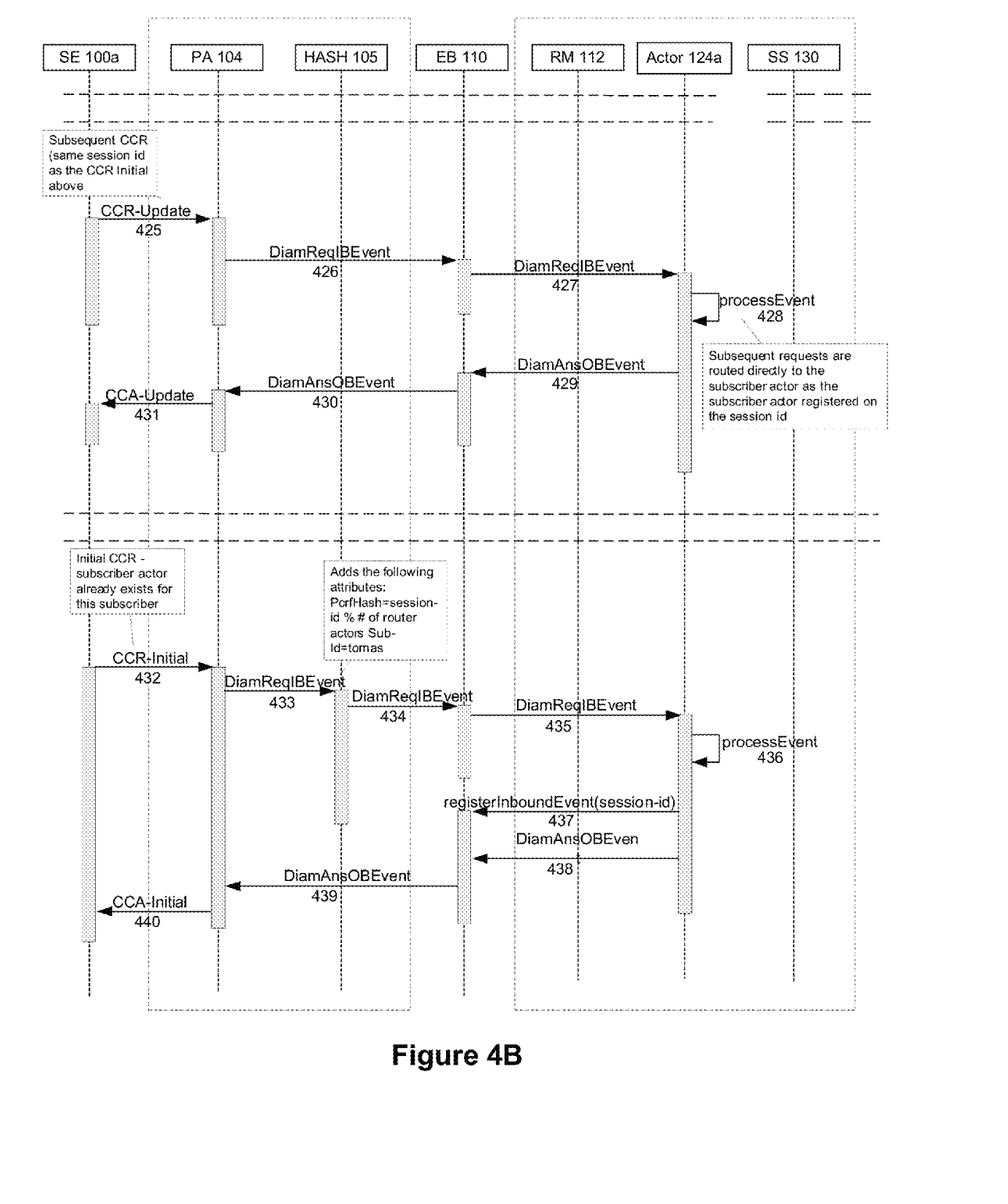

FIGS. 4A and 4B show examples of routing and flow in an alternative system for subscriber-centric routing of network traffic/events, in accordance with an alternative embodiment of the invention. FIG. 4A shows an example of routing and flow for an initial credit control request received over a Diameter interface. Prior to this request no actor has been established related to the particular subscriber having the particular GUID. FIG. 4B shows examples of routing and flow for subsequent requests. These requests can therefore be directed to the previously established actor associated with the GUID.

FIG. 4A shows an example of routing and flow for an initial credit control request (CCR) received over a Diameter interface. As shown in FIG. 4A, at 401 an initial credit control request is received from subscriber equipment 100a over the network over a Diameter interface. At this point no actor has been instantiated for this subscriber.

At 402, protocol adapter 104, forwards the request to HASH 105 which adds attributes to the request. HASH 105 is a so-called hash function, an entity that is invoked before the event is published to the event broker. In this case, an attribute called PcrfHash is added to the incoming event (CCR), the value of the PcrfHash attribute is calculated by taking the hashcode value (see Java hashCode( ) method) of the session id in the incoming CCR modulo the number of router actors. Each router actor is assigned a number (0—numberOfRouterActors−1) and this is used to evenly distribute incoming requests among the router actors. A Sub-Id attribute is also added to the incoming event, the value of the Sub-Id attribute is retrieved from the incoming event (CCR). The Sub-Id attribute is used to route subsequent initial requests directly to the actor 124a as described below.

At 403, the modified request is published to event broker 110. At 404, event broker 110 transmits the event to routing module 112. At 405 routing module 112 stores the event state in an actor store. Routing module 112 can be implemented, for example, as one or more router actors. At 406, router module publishes a request for profile information to event broker 110. At 407, event broker 110 requests profile information from subscriber service 130. At 408, subscriber service 130 responds to event broker 110 with profile information. At 409, event broker 110 transmits profile information to routing module 112. At 410, routing module recreates the event from the actor store. At 411, event broker 110 retrieves the GUID from the profile information. At step 412, routing module 112 instantiates actor 124a (if absent). Note that this step is omitted if an actor has previously been instantiated for the subscriber. At 413, routing module 112 published the event to the actor 124a. At 414, actor 124a stores the event locally. At 415, actor 124a publishes a request for profile information to event broker 110. At 416, event broker 110 transmits the profile request to subscriber service 130. At 417, subscriber service 130 responds to event broker 110 with profile data. At 418, event broker 110 responds to actor 124a with profile data. Actor 124a retrieves and processes all subscriber identifiers associated with the subscriber. At 419, actor 124a registers for inbound events with event broker 110. This registration is performed to receive initial incoming requests containing one of the associated subscriber ids directly in the Actor, without going through a router actor. At 420, actor 124a processes the event. At 421, the session identifier of the inbound event is registered with event broker 110. This allows subsequent messages of the same session to be routed to the same actor without having to go through the router actor. At 422 the actor 124a responds to the initial credit control request. At 423, the event broker 110 published the response to the protocol adapter 104. At 424 the response is forwarded to the subscriber equipment 100a.

FIG. 4B shows examples of routing and flow for subsequent requests. Subsequent requests having the same session identifier are routed directly to the actor 124a associated with the subscriber 100 because the actor 124a is registered with respect to the session identifier. As shown in FIG. 4B, a subsequent update credit control request is received from subscriber equipment 100a over the network via a Diameter interface at 425. This request has the same session identifier as the prior request and an actor 124a has already been instantiated for this subscriber. At 426, protocol adapter 104, forwards the request to event broker 110. At 427, event broker 110 transmits the event to actor 124a. At 428, actor 124a processes the event. At 429, the actor 124a responds to the updated credit control request. At 430, the event broker 110 publishes the response to the protocol adapter 104. At 431 the response is forwarded to the subscriber equipment 100a.

Subsequent initial requests having a different session identifier present a conflict. A router actor of router module 112 can register on the on the PcrfHash attribute. However, the actor 124a registered with respect to the GUID of the subscriber 100 overrides such that the event is routed to the actor 124a associated with the subscriber 100. As shown in FIG. 4B, a subsequent initial credit control request is received from subscriber equipment 100a over the network via a Diameter interface at 432. An actor 124a has already been instantiated for this subscriber; however this request represents a different session having a different session identifier. At 433, protocol adapter 104, forwards the request to PCRF hash function, HASH 105 which adds attributes to the request such as a PcrfHash attribute and a subscriber id attribute—the value is retrieved from the incoming request. At 434, the modified request is published to event broker 110. At 435, event broker 110 publishes the event to the actor 124a. At 436, actor 124a processes the event. At 437, the session identifier of the inbound event is registered with the event broker 110. At 438 the actor 124a responds to the initial credit control request. At 439, the event broker 110 published the response to the protocol adapter 104. At 440 the response is forwarded to the subscriber equipment 100a.

The present invention may be conveniently implemented using one or more conventional general purpose or specialized digital computer, computing device, machine, or microprocessor, and/or network of same, programmed according to the teachings of the present disclosure.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for providing subscriber-based policy management in relation to a subscriber associated with a plurality of different subscriber identifiers operating on one or more microprocessors, the system comprising:
    an event broker which receives incoming traffic from a subscriber which includes one subscriber identifier of the plurality of different subscriber identifiers;
    a subscriber service which resolves the subscriber identifier into a global unique subscriber identifier (GUID) associated with the subscriber, wherein the GUID is associated with a subscriber profile corresponding to the subscriber;
    an actor associated with the GUID which processes the incoming traffic based on the subscriber profile; and
    a routing module which routes the incoming traffic to the actor associated with the GUID.

2. The system of claim 1, further comprising:
    a subscriber store which includes the subscriber profile wherein the subscriber service accesses the subscriber store; and
    wherein the event broker is operable to transmit the one subscriber identifier to the subscriber service and receive the GUID from the subscriber service.

3. The system of claim 1, wherein the incoming traffic comprises a credit control request from a subscriber which includes one subscriber identifier of the plurality of different subscriber identifiers; and wherein:
    the event broker receives the credit control request from the subscriber;
    the subscriber service resolves the subscriber identifier into a GUID, wherein the GUID is associated with a subscriber profile corresponding to the subscriber;
    the routing module routes the incoming traffic to the actor associated with the GUID; and
    the actor associated with the GUID processes the credit control request based on the subscriber profile.

4. The system of claim 1, wherein the subscriber profile includes a service attribute, and wherein the actor associated with the GUID is operable to retrieve the service attribute from the subscriber profile and process the incoming traffic based on the service attribute.

5. The system of claim 1, wherein the incoming traffic comprises a plurality of concurrent sessions and wherein:
    the routing module is operable to route the plurality of concurrent sessions to the actor associated with the GUID; and
    the actor is operable to process each of the plurality of the concurrent sessions based on the subscriber profile and at least one other of the concurrent sessions.

6. The system of claim 1, wherein the subscriber profile includes a service attribute and the incoming traffic comprises a plurality of concurrent sessions, and wherein:
    the routing module is operable to route the plurality of concurrent sessions to the actor associated with the GUID; and
    the actor is operable to retrieve the service attribute from the subscriber profile and process each of the plurality of the concurrent sessions based on the service attribute and information from at least one other of the concurrent sessions.

7. A method of providing subscriber-based policy management in relation to a subscriber associated with a plurality of different subscriber identifiers, the method operating on one or more microprocessors and comprising:
    (a) receiving incoming traffic from a subscriber which includes one subscriber identifier of the plurality of different subscriber identifiers;
    (b) resolving the subscriber identifier into a global unique subscriber identifier (GUID), wherein the GUID is associated with a subscriber profile corresponding to the subscriber;
    (c) routing the incoming traffic to an actor associated with the GUID; and
    (d) processing the incoming traffic based on the subscriber profile.

8. The method of claim 7, wherein step (b) comprises: transmitting the subscriber identifier to a subscriber service and receiving from the subscriber service the GUID, wherein the subscriber service accesses a subscriber store which includes the subscriber profile.

9. The method of claim 7, wherein step (a) comprises receiving a credit control request from a subscriber which includes one subscriber identifier of the plurality of different subscriber identifiers.

10. The method of claim 7, wherein the subscriber profile includes a service attribute, and wherein step (d) comprises:
    (d1) retrieving the service attribute from the subscriber profile; and
    (d2) processing the incoming traffic based on the service attribute retrieved from the subscriber profile.

11. The method of claim 7, wherein the incoming traffic comprises a plurality of concurrent sessions and wherein:
    step (c) comprises routing the plurality of concurrent sessions to an actor associated with the GUID; and
    step (d) comprises processing each of the plurality of the concurrent sessions based on the subscriber profile and at least one other of the concurrent sessions.

12. The method of claim 7, wherein the incoming traffic comprises a plurality of concurrent sessions and wherein:
    step (c) comprises routing the plurality of concurrent sessions to a single actor associated with the GUID; and
    step (d) comprises processing with the single actor each of the plurality of the concurrent sessions based on the subscriber profile.

13. The method of claim 7, wherein the subscriber profile includes a service attribute and the incoming traffic comprises a plurality of concurrent sessions, and wherein:

step (c) comprises routing the plurality of concurrent sessions to an actor associated with the GUID; and step (d) comprises, (d1) retrieving the service attribute from the subscriber profile, and (d2) processing each of the plurality of the concurrent sessions based on the service attribute and at least one other of the concurrent sessions.

14. A non-transitory computer readable storage medium including instructions stored thereon which, when executed by a computer, cause the computer to perform the steps comprising:

providing a flexible data structure, wherein the flexible data structure maps a plurality of different subscriber identifiers associated with a subscriber to a GUID and a subscriber profile associated with the subscriber;

receiving incoming traffic from a subscriber which includes one subscriber identifier of the plurality of different subscriber identifiers;

resolving the subscriber identifier into the GUID;

routing the incoming traffic to an actor associated with the GUID; and processing, with said actor, the incoming traffic based on the subscriber profile.

15. The non-transitory computer readable storage medium of claim 14, wherein the resolving step comprises:

resolving the subscriber identifier into the GUID by transmitting the subscriber identifier to a subscriber service and receiving from the subscriber service the GUID wherein the subscriber service accesses the flexible data structure which includes the subscriber profile.

16. The non-transitory computer readable storage medium of claim 14, wherein receiving step comprises:

receiving incoming traffic from a subscriber which includes one subscriber identifier of the plurality of different subscriber identifiers, wherein the incoming traffic comprises a credit control request from the subscriber which includes one subscriber identifier of the plurality of different subscriber identifiers.

17. The non-transitory computer readable storage medium of claim 14, wherein: for the providing step the subscriber comprises a service attribute; and wherein the processing step comprises processing with said actor the incoming traffic based on the subscriber profile by retrieving the service attribute from the flexible data structure and processing the incoming traffic based on the service attribute retrieved from the flexible data structure.

18. The non-transitory computer readable storage medium of claim 14, wherein the instructions stored thereon, when executed by a computer, cause the computer to perform the steps of:

wherein for the receiving step the incoming traffic comprises a plurality of concurrent sessions; and wherein the processing step comprises processing with said actor each of the plurality of concurrent sessions based on the subscriber profile.

19. The non-transitory computer readable storage medium of claim 14, wherein the instructions stored thereon, when executed by a computer, cause the computer to perform the steps of:

wherein for the receiving step the incoming traffic comprises a plurality of concurrent sessions; and wherein the processing step comprises processing with said actor each of the plurality of concurrent sessions based on the subscriber profile and based on at least one other of the plurality of concurrent sessions.

* * * * *

UNITED STATES PATENT AND TRADEMARK OFFICE
CERTIFICATE OF CORRECTION

PATENT NO. : 8,824,452 B2  Page 1 of 1
APPLICATION NO. : 13/671053
DATED : September 2, 2014
INVENTOR(S) : Ericson et al.

It is certified that error appears in the above-identified patent and that said Letters Patent is hereby corrected as shown below:

In the Drawing

On sheet 5 of 6, in figure 4A, line 32, delete "retrived" and insert -- retrieved --, therefor.

Signed and Sealed this
Tenth Day of March, 2015

Michelle K. Lee
*Deputy Director of the United States Patent and Trademark Office*